May 6, 1969    L. R. SODERBERG    3,442,501
NON-MECHANICAL VARIABLE ORIFICE SHOCK ABSORBER
Filed Feb. 25, 1966

INVENTOR.
LAURENCE R. SODERBERG
BY
*Gary D. Fields*
ATTORNEY

United States Patent Office 3,442,501
Patented May 6, 1969

3,442,501
NON-MECHANICAL VARIABLE ORIFICE
SHOCK ABSORBER
Laurence R. Soderberg, Broomfield, Colo., assignor to The Martin-Marietta Corporation, New York, N.Y., a corporation of New York
Continuation-in-part of application Ser. No. 470,840, July 9, 1965. This application Feb. 25, 1966, Ser. No. 530,073
Int. Cl. B60g *11/26;* F16f *3/00, 5/00*
U.S. Cl. 267—64          14 Claims

ABSTRACT OF THE DISCLOSURE

A shock absorber having a non-mechanical variable orifice with self-regulating response to changing shock conditions, this is accomplished by utilizing a hydraulic shock fluid in the shock absorber having non-Newtonian rheological properties.

---

This application is a continuation-in-part of my earlier application, SN 470,840 filed July 9, 1965.

The principle of operation of most fluid shock absorbers, is that they absorb or dampen shock by transmitting a fluid from one reservoir to another through a small opening or orifice of a fixed size. This fluid may be either a gas or a liquid or a combination of both. The difficulty with such an arrangement is that the shock absorber is unable to properly dampen a wide range of shock conditions. Thus, if the orifice is small so that it will properly dampen mild shocks, it will be relatively rigid and elastic to sharp shocks and rebound will occur. On the other hand if the orifice is large enough to satisfactorily dampen sharp shocks, the more gradual shocks will be insufficiently dampened. Thus, it is virtually impossible to utilize a shock absorber having a single orifice to dampen a wide range of shock forces and such a shock absorber finds use only where the shock conditions can be expected to remain relatively constant, such as in a door closure.

The shortcomings of shock absorbers having a constant size orifice has been long recognized in aeronautical and automotive applications. Various attempts have been made to overcome this difficulty by the use of variable orifice shock absorbers. For example, in the oleo-pneumatic shock absorber a variable orifice can be obtained by utilizing a metering pin of varying diameter which moves back and forth through the orifice as a shock is absorbed. However, it has been found that the diameter of the metering pin is a function of its length, and skillful design of the metering pin presents difficulty since the design needed for the pin is non-linear. Thus, there have been attempts to simplify this problem to a point where it is amenable to mathematical treatment or to treat the problem by numerical or graphical methods. The former method has a defect that the assumptions necessary for any mathematical treatment are so unrealistic as to lead in the end to a system which bears little resemblance to the physical problems at hand. The latter method lacks generality to all types of situations. Furthermore, the problems encountered in machining a non-linear metering pin are paramount.

It has been found that for maximum shock absorber efficiency a relatively small orifice is required at the beginning of the stroke when the piston velocity is low but that a larger orifice is desirable during the middle part of the travel when the velocity is at a maximum and then near the end of the stroke a smaller orifice is desirable since the velocity is decreasing. Through a series of drop tests a needle orifice can be devised which will approximate this condition but such arrangements have not been too satisfactory.

Another design is to utilize a plurality of orifices with only one of them being open during the beginning and end of the stroke but one or more additional orifices being opened during the center portion of the stroke. This is accomplished by utilizing rather complicated bypass channels and grooves which will be blocked by the piston or other valve elements in the shock absorber during a portion of the travel but will be opened during the portion where flow through these channels and passageways is desirable.

Furthermore, variations in orifice area due to manufacturing tolerances is often intolerable. Orifices made by clearance between large diameter tubes and plungers, for example, are bad because the actual gap forming the clearance will be very small and the necessary tolerances on the diameters involved will have an inappreciable effect on the total area. The best orifices are drilled holes covered where appropriate by a valve.

Also, there is the possibility that the valves will jam or otherwise become inoperative. This possibility is particularly important where shock absorbers are used on high speed aircraft since the failure of a shock absorber could result in damage to the aircraft or possible loss of human life when the aircraft is landing. Furthermore, as guidance and control systems for long range missiles become more sophisticated so that they can more accurately hit their target, it becomes increasingly important that missile silos be provided with shock absorber means to shock isolate the silo from explosions near the silo so that the missile may be launched after the attack. This is important both from an economics standpoint, since the missile and silo are quite costly, and also from a national security standpoint, since it may be desirable to be able to launch the missile from the silo after an attack.

The present invention contemplates providing a shock absorber with a variable orifice effect by non-mechanical means. This is accomplished by utilizing a hydraulic shock fluid in the shock absorber having non-Newtonian rheological properties, i.e. a shock fluid in which the internal shear force varies non-linearly with flow velocity. There are three types of non-Newtonian liquids, namely: pseudoplastics, dilatants and Bingham plastics. All non-Newtonian fluids are characterized by the fact that as the flow velocity changes, the shear force or viscous force changes at a non-proportional rate. Thus, it can be seen by utilizing such fluids in a shock absorber having a non-variable orifice, the orifice will act as if it is varying in size as changing shock forces are applied due to the non-linear change in shear force. Thus, it can be seen that by proper orifice sizing and choice of non-Newtonian fluid as would be readily apparent to one skilled in the art, a shock absorber can be provided having a non-mechanical variable orifice with self-regulating response to varying shock conditions which will be effective to dampen a wide range of shock forces. Such a shock absorber is provided by utilizing the novel method of applying a shock force to a confined non-Newtonian fluid and forcing the fluid through a non-variable orifice to obtain a self-regulating variable orifice effect. In other words, the non-Newtonian fluid not only causes the orifice to be responsive to variations in the amplitude of the applied shock force but also to be responsive to the rate at which the shock force is applied to or removed from the shock absorber.

Among the objects of this invention are to provide a novel shock absorber; to provide a shock absorber which will dampen a wide range of shock forces; to provide a shock absorber having a variable orifice effect without the necessity of a mechanical variable orifice; to provide a shock absorber having a non-mechanical variable orifice with a self-regulating response to changing stock conditions; to provide a shock absorber which utilizes a hydraulic shock fluid having non-Newtonian rheological properties; to provide a shock absorber utilizing a shock fluid in which the shearing forces of the fluid varies non-linearly with the flow velocity thereof; to provide in one embodiment such a novel shock absorber which is self-restoring; and to provide in an alternative embodiment a shock absorber which is non-restoring.

Additional objects and novel features of this invention will become apparent in the description which follows, taken in conjunction with the accompanying drawings in which.

Figure 1:
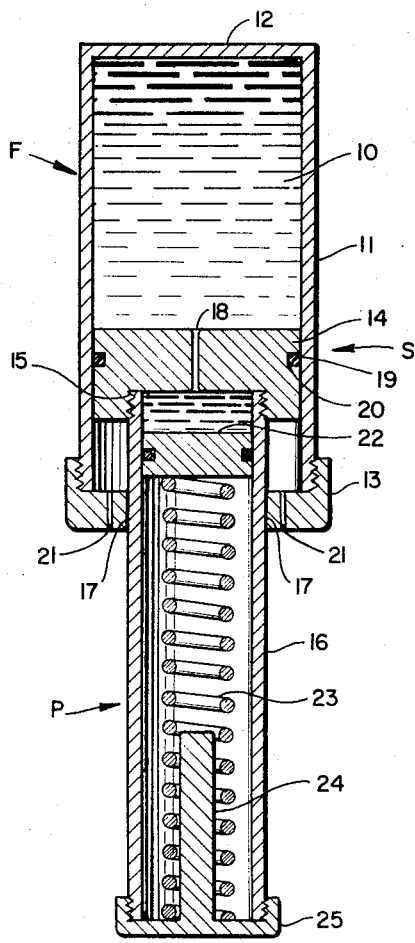
FIG. 1 is a longitudinal section of a preferred form of this invention showing a self-restoring shock absorber utilizing a non-Newtonian shock fluid.

In accordance with this invention, a shock absorber S is provided, as in FIG. 1, having a fluid chamber F for containing a non-Newtonian shock absorber fluid 10. Conveniently, fluid chamber F may have a cylindrical side wall 11 closed at the upper end by an end wall 12, the lower end thereof being closed by cap 13 which may be threadably attached to the side walls, as shown, or attached by other suitable means, such as welding.

Conveniently, a piston assembly P including primary piston 14 is provided within chamber F for movement therein and has a threaded counterbore 15 for receiving piston rod 16. Of course, the piston rod could be connected to the piston by some other means, such as welding. Conveniently, the piston rod is cylindrical, the lower end thereof extending through an opening 17 in cap 13. If required, opening 17 may be provided with a wiper (not shown) to facilitate easy movement of the piston rod through the opening.

It will be understood that when a shock force is applied to the shock absorber S, the piston will be forced upwardly with respect to fluid chamber F causing the non-Newtonian shock fluid 10 to be forced through a non-variable orifice 18 in the piston. Conveniently, the piston is provided with an O-ring 19 in a groove 20 which acts as a seal to prevent any of the fluid from passing around the piston. To prevent a vacuum being formed in the area between the piston 14 and cap 13 and outwardly of piston rod 16, end cap 13 is provided with one or more holes 21 which may be circumferentially spaced, if desired.

In order to restore the shock fluid to the chamber above piston 14 after the shock force has been dampened, a restoring piston 22, having an O-ring seal as shown, is provided within hollow piston rod 16 which is urged upwardly by coil spring 23 extending substantially the full length of the piston rod, the lower end thereof being received in a spring guide 24 shown as formed integrally with end cap 25 which may be threadably received on the lower end piston rod 16, as shown, or attached by some other suitable method, such as welding. The spring guide 23 prevents coil spring 22 from buckling when compressed due to the downward movement of restoring piston 21 when a shock force is applied to the shock absorber.

Thus, when a shock force is encountered, the piston rod 16 and primary piston 14 will move upwardly within fluid chamber F forcing the non-Newtonian shock fluid 10 through orifice 18 into the hollow piston rod 16. This action will force restoring piston 22 downwardly against the force of coil spring 23 and will also compress the air within the piston rod below restoring piston 22. Then, upon the removal or dampening of the shock force, the restoring piston 22 will be urged upwardly by coil spring 23 as well as by the compressed air within the piston rod 16 causing the non-Newtonian fluid to move through orifice 18 and into the fluid chamber F forcing piston 14 downwardly to a position such as that shown in FIG. 1. It will be understood that the embodiment of FIG. 1 is shown for illustrative purposes only and that the principle of providing a non-mechanical variable orifice may be utilized in shock absorbers of various design as would be readily apparent to one skilled in the art.

As mentioned above, there are three types of non-Newtonian fluids which could find application in this invention. The first of these is the pseudoplastic fluid which is characterized by the fact that as its flow velocity increases, the shear force or viscous force increases at a lesser rate. Conversely, as the flow velocity decreases, the shear force decreases but at a slower rate. This is clearly shown in the graph of FIG. 2 in which force is plotted as the ordinate and velocity is plotted as the abscissa. In this figure, a Newtonial fluid such as oil or any common hydraulic fluid is illustrated by straight line 26 which is shown as running at a 45 degree angle. This angle will vary, of course, depending on the viscosity of the fluid. The important feature of Newtonian fluids is that as the velocity is increased, the force will increase proportionally. For example, if the velocity of the fluid illustrated by line 26 is doubled, then the force necessary to cause this fluid to flow at that velocity is also doubled.

However, with a pseudoplastic fluid, as illustrated by line 27, it can be seen that as the velocity increases, the force also increases but at a lesser rate. Thus, if the velocity increases from velocity $a$ to velocity $b$ where velocity $b$ is twice velocity $a$, it will be seen that the required force for this change in velocity increases from a force A to a force B but that force B is not twice force A. Thus, if a psuedoplastic fluid, such as a hydrocarbon emulsion, is used in fluid chamber F and orifice 18 is relatively small, it can be seen that orifice 16 will act as a dilating orifice as the shock force applied to the shock absorber increases, since the velocity of fluid flow will increase at an even faster rate. With such an arrangement, it can be seen that the shock absorber is self-regulating and will adequately dampen mild shocks but will not rebound upon receiving a sharp shock since the orifice will act as if it were dilating when such a force is applied. Furthermore, as the shock absorber reaches the end of its stroke and begins to slow down, the orifice 18 will act as if it is contracting since the velocity of fluid flow will decrease faster than the force applied, as can readily be seen from line 27 of FIG. 2. Of course, upon the dampening or removal of the shock force, the fluid will tend to be forced upwardly through orifice 18 back into fluid chamber F by means of restoring piston 22 which is urged upwardly by the coil spring 23 and the compressed air within the piston rod 16.

Although pseudoplastic fluids are the most common and most readily available non-Newtonian fluid, in some applications it may be desirable to use a dilatant fluid which behaves in the reverse manner as a pseudoplastic material. Thus, a dilatant material is characterized by the fact that as its flow velocity increases, the shear force or viscous force increases at an even higher rate. Conversely, as the flow velocity decreases, the shear force decreases at a greater rate. This characteristic of dilatant fluids is illustrated by line 28 of FIG. 2. If the velocity increases from velocity $c$ to velocity $d$ where velocity $d$ is twice velocity C, it will be seen that the change in force required for this change in velocity increases from a force C to a force D, force D being more than twice force C. Therefore, if a dilatant fluid, such as a polymeric solution, is used in fluid chamber F and orifice 18 is relatively large, as a shock force is applied the orifice will act as if it is constricting, requiring an ever-increasing force to force the dilatant fluid through the orifice at a slower incremental increase in velocity. Restoration of the fluid to fluid chamber F after the removal or dampening of the shock force will be accomplished in the same manner as with the pseudoplastic fluid.

In some cases, it may be desirable to provide a shock absorber which is not recoverable, i.e. it cannot be restored for resisting a second force but is used on a one-time basis only. Particular applications of such a shock absorber might be where it is desired to drop equipment of various types into a remote area from an aircraft and it is desirable to provide a shock absorber system for isolating the equipment from the shock force encountered when the package strikes the ground. However, since the equipment will not be dropped again, there is no need for a recovery system within the shock absorber. Thus, if the recovery piston 22 and its associate parts can be eliminated from the shock absorber and a savings can be made both in weight and in expense. Another possible application for such a shock absorber would be for landing instrument packages on the moon, the planets or any other celestial body. In such a case, it is necessary to isolate delicate instruments from severe shock but once the instrument package has landed on the surface of the celestial body, the shock device is no longer needed. Also, on space missions, it is essential that the weight be reduced as much as possible so that a larger functional payload may be carried. Thus, if the restorable mechanism of the shock absorber can be eliminated, a substantial weight savings can be obtained.

Figure 3:
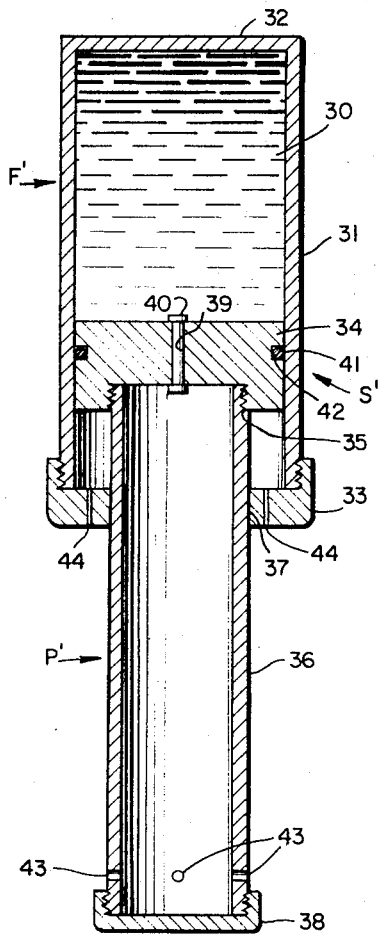
FIG. 3 is a longitudinal section, similar to FIG. 1, but showing an alternative form of the invention wherein the shock absorber is non-restoring.

A non-recoverable shock absorber is shown in FIG. 3 wherein a shock absorber S' is provided having a fluid chamber F' for containing a non-Newtonian fluid 30 as shown. As in the previous embodiment, a fluid chamber F' comprises a cylindrical side wall 31 having an upper closed end 32, the lower end being closed by end cap 33, which may be threadably attached to side walls 31 as shown or attached in any other suitable manner, as such by welding.

Conveniently, a piston 34 is slidable within fluid chamber F' and is provided with a threaded counterbore 35 to which a piston rod 36 is attached. Of course, the piston rod could be attached to the piston in some other suitable manner, if desired, such as welding. The hollow piston rod extends through an opening 37 in end cap 33 and is closed at its lower end by a cap 38 which is also shown as being threadably received on the piston rod. Advantageously, the piston 34 is provided with a non-variable orifice 39 therethrough, which is normally closed by deformable plastic blowout plug 40 which prevents the non-Newtonian shock fluid 30 from passing through the orifice. The closure for the orifice could be made from any other frangible material such as a metallic diaphragm or plastic diaphragm, if desired, plastic plug 40 being shown by way of illustration only. Piston 34 is also provided with an O-ring 41 in a groove 42 to prevent the shock fluid 30 from passing around the piston 34 when a shock force is applied.

It will be understood that when a shock force is applied to the shock absorber S', piston 34 will move upwardly in fluid chamber F' until the pressure within the fluid chamber builds sufficiently to force plug 40 downwardly through orifice 39 so that the shock fluid 30 can then pass through the orifice. The plug 40 is necessary to prevent the fluid from dripping through the orifice when no shock force is being applied. When the shock force is applied and plug 40 has been blown out of orifice 39, the non-Newtonian fluid will pass through the orifice and will behave in the manner described above for pseudoplastic or dilatant fluids. As in the previous embodiment, either type of fluid could be used for certain shock absorber applications. As the fluid 30 passes into piston rod 34, the air within the piston rod is permitted to escape through openings 43, provided in the lower end thereof adjacent to cap 38 and may be circumferentially spaced, as shown, if desired. End cap 33 is provided with openings 44, which may be circumferentially spaced, to allow air to enter the space between cap 33 and piston 34 so that the partial vacuum is not formed therein which might adversely affect the operation of shock absorber S'.

It will be understood that the shock absorber S' of FIG. 3 could be used in an inverted position, in which case it may be used to omit plug 40 if there is little possibility that the shock absorber will be tipped over.

Figure 2:
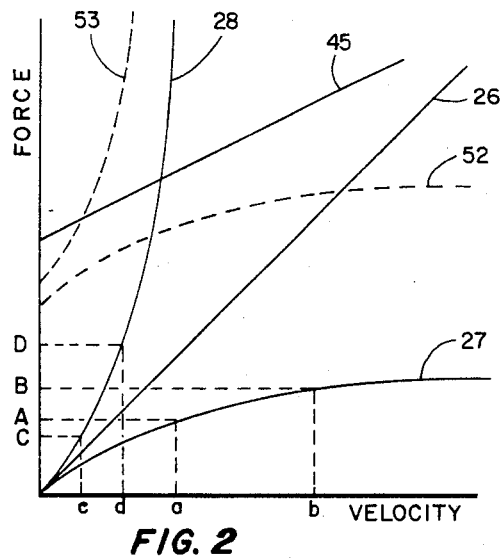
FIG. 2 is a force versus velocity graph illustrating the characteristics of various non-Newtonian fluids as compared to Newtonian fluids.

In some applications, it might be desirable to use a Bingham fluid which is characterized by the fact that a predetermined amount of force must be applied thereto before the material begins flowing, but once it flows, it behaves as a Newtonian fluid. The characteristics of this material are illustrated in FIG. 2 by line 45. A Bingham fluid might be used in the shock absorber S' of FIG. 3 without the necessity of plug 40 since no flow would take place until shock force had been applied to the device which is greater than the yield point of the fluid.

Although the basic types of non-Newtonian fluids have been described, it will be understood that in specific applications, it may be desirable to use a non-Newtonian fluid having the characteristics of more than one of the basic types. For example, a non-Newtonian fluid could be designed having a yield point like a Bingham fluid, but once the applied shock force exceeds that yield point, it behaves like a pseudoplastic fluid. The behavior of such a fluid is shown in FIG. 2 as dotted line 52. Similarly, another non-Newtonian fluid could be designed having a yield point like a Bingham fluid, but once the applied shock force exceeds that yield point, it behaves like a dilatant fluid. The behavior of this fluid is shown in FIG. 2 as dotted line 53.

It is also contemplated that a thixotropic shock fluid could be used in some environments. A thixotropic fluid varies from a pseudoplastic fluid in that the relationship of the shear forces of a thixotropic fluid with respect to velocity change over a period of time and will vary depending on whether the shock force is increasing or decreasing. Thus, a time constant is involved when dealing with thixotropic fluids. The characteristics of such a fluid, if plotted on the graph of FIG. 2, would result in a hysteresis curve.

From the foregoing, it can be seen that the objects and novel features of this invention hereinbefore set forth have been fulfilled to a marked degree. Applicant has provided a novel shock absorber which will dampen a wide range of shock forces by utilizing a non-Newtonian shock fluid. This is accomplished through a novel method of transmitting the shock force to a confined non-Newtonian fluid and forcing it through a non-variable orifice to provide a variable orifice effect to dampen a wide range of shock forces. Additionally, the orifice has a self-regulating response, when a non-Newtonian fluid is used, to changing shock conditions due to the non-linear change in the velocity of the fluid with a change in the force applied. Furthermore, such a fluid can be used in both a restoring shock absorber, as illustrated in FIG. 1, and in a non-restoring shock absorber, as illustrated in FIG. 3.

Although a preferred form of this invention and an alternative form of this invention have been illustrated and described, it will be understood that various changes and variations may be made and that the features of one embodiment may be incorporated in the other embodiments, all without departing from the spirit and scope of this invention.

What is claimed is:
1. A shock absorber comprising:
containing means;
a non-Newtonian fluid in said containing means;
means movable in said containing means for transmitting a shock force to said fluid;
a non-variable orifice in one of said containing means and said movable means, said non-Newtonian fluid being forced through said orifice upon movement of said movable means thereby providing a variable orifice effect with a self-regulating response to changing shock conditions and to dampen a wide range of shock forces.

2. A shock absorber as set forth in claim 1, wherein the shear force of said fluid varies non-linearly with flow velocity.

3. A shock isolation device as set forth in claim 2, wherein the shear force of said fluid varies at a lesser rate than the velocity of flow of said fluid through said orifice.

4. A shock absorber as set forth in claim 2, wherein the shear force of said fluid varies at a greater rate than the velocity of flow of said fluid through said orifice.

5. A shock absorber comprising:
   a hydraulic cylinder having a closed end;
   a primary piston slidable within said cylinder and having an orifice extending therethrough;
   a piston rod connected to said piston and extending through the other end of said cylinder; and
   a non-Newtonian fluid in said cylinder, adapted to be forced through said orifice at a non-linear velocity upon transmission of a shock force to said fluid by said piston, thereby providing a variable orifice effect with a self-regulating response to changing shock conditions and to dampen a wide range of shock forces.

6. A shock absorber as set forth in claim 5, wherein said piston rod is hollow and said orifice is in communication therewith so that upon the application of a shock force to said piston, said fluid will be forced through said orifice into said piston rod.

7. A shock absorber as set forth in claim 6, including:
   a restoring piston within said piston rod; and
   spring means in said piston rod urging said restoring piston toward said primary piston to force said fluid back through said orifice after the dampening or removal of said shock force to return said fluid to said cylinder so that said shock absorber may dampen successive shock forces.

8. A shock absorber as set forth in claim 7, wherein the end of said piston rod opposite said primary cylinder is closed so that the air within said piston rod is compressed by the movement of said restoring piston during the transmission of said shock force and then serves as an additional restoring force for urging said restoring piston toward said primary piston after the dampening of said shock force.

9. A shock absorber as set forth in claim 5, including:
   a blowout plug in said orifice adapted to be forced out of said orifice by said fluid upon transmission of a predetermined shock force thereto.

10. A method of providing a non-mechanical variable orifice effect for absorbing a wide range of shock forces, comprising the steps of:
    providing a confined quantity of non-Newtonian fluid, applying a shock force to said confined non-Newtonian fluid by a movable means acting on said fluid; and
    forcing said fluid through a non-variable orifice to dampen said shock force.

11. A method, as set forth in claim 10, wherein said fluid has an internal shear force which varies non-linearly with flow velocity.

12. A method, as set forth in claim 10, wherein said fluid is a pseudoplastic.

13. A method, as set forth in claim 11, wherein said fluid is a dilatant.

14. A method, as set forth in claim 11, wherein said fluid is a Bingham fluid.

References Cited

UNITED STATES PATENTS

| | | | |
|---|---|---|---|
| 2,769,632 | 11/1956 | De Carbon | 207—64 |
| 3,077,345 | 2/1963 | Andersson et al. | 267—64 |
| 3,083,000 | 3/1963 | Perdue | 267—64 |
| 3,304,077 | 2/1967 | Eaton et al. | 267—64 |

DRAYTON E. HOFFMAN, *Primary Examiner.*

U.S. Cl. X.R.

267—1

U.S. DEPARTMENT OF COMMERCE
PATENT OFFICE
Washington, D.C. 20231

UNITED STATES PATENT OFFICE
CERTIFICATE OF CORRECTION

Patent No. 3,442,501                          May 6, 1969

Laurence R. Soderberg

It is certified that error appears in the above identified patent and that said Letters Patent are hereby corrected as shown below:

Column 3, line 61, "23" should read -- 24 --; line 61, "22" should read -- 23 --; line 62, "21" should read -- 22 --. Column 4, line 33, "psuedoplastic fluid" should read -- pseudoplastic fluid --; lines 34 and 35, "hydrocarbon emulsion" should read -- polymeric solution --; lines 67 and 68, "polymeric solution" should read -- hydrocarbon emulsion --.

Signed and sealed this 12th day of January 1971.

(SEAL)
Attest:

Edward M. Fletcher, Jr.
Attesting Officer

WILLIAM E. SCHUYLER, JR.
Commissioner of Patents